May 19, 1953 F. G. HALLDEN ET AL 2,639,211
MULTISTYLUS FACSIMILE MACHINE
Filed March 25, 1949 11 Sheets-Sheet 1
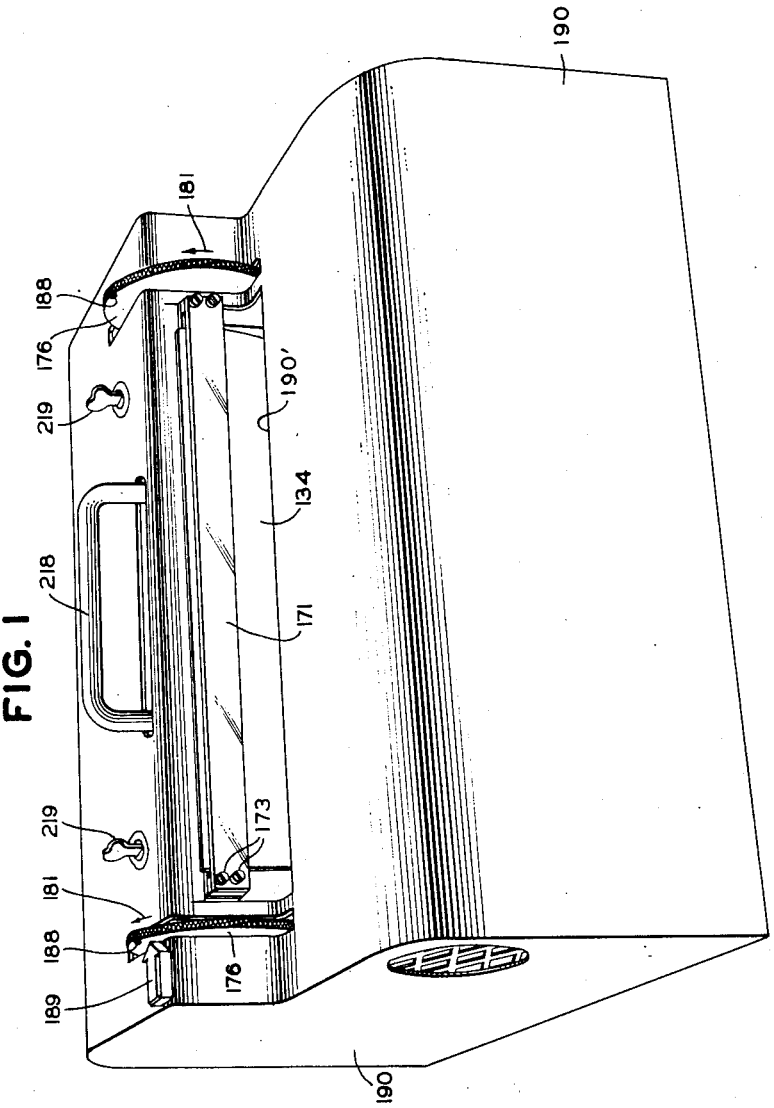
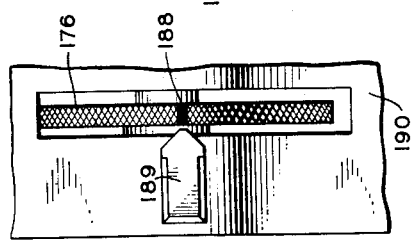
INVENTORS
F. G. HALLDEN
D. M. ZABRISKIE
BY
ATTORNEY May 19, 1953     F. G. HALLDEN ET AL     2,639,211
MULTISTYLUS FACSIMILE MACHINE
Filed March 25, 1949                              11 Sheets-Sheet 2

INVENTORS
F. G. HALLDEN
D. M. ZABRISKIE
BY
ATTORNEY

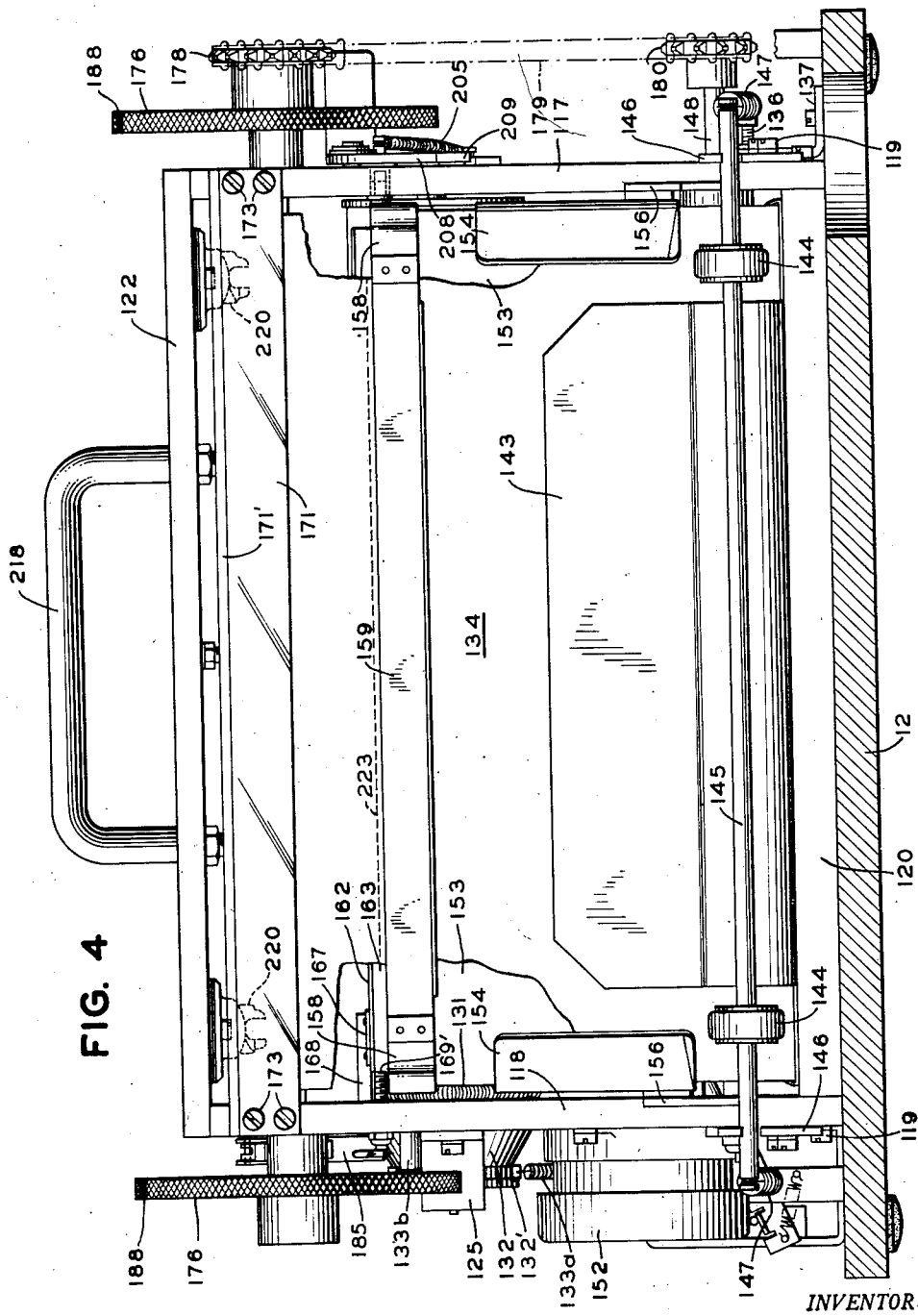

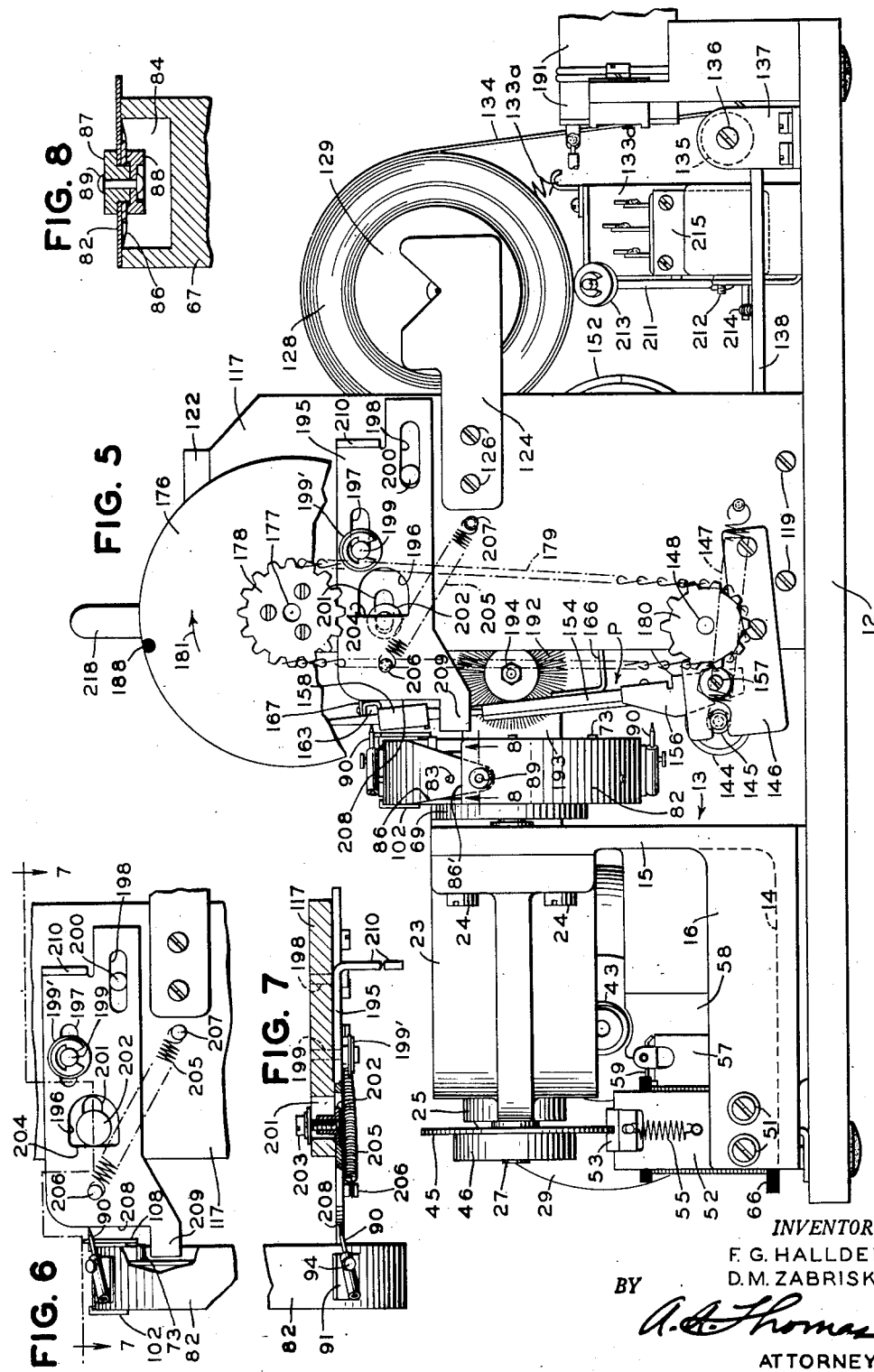

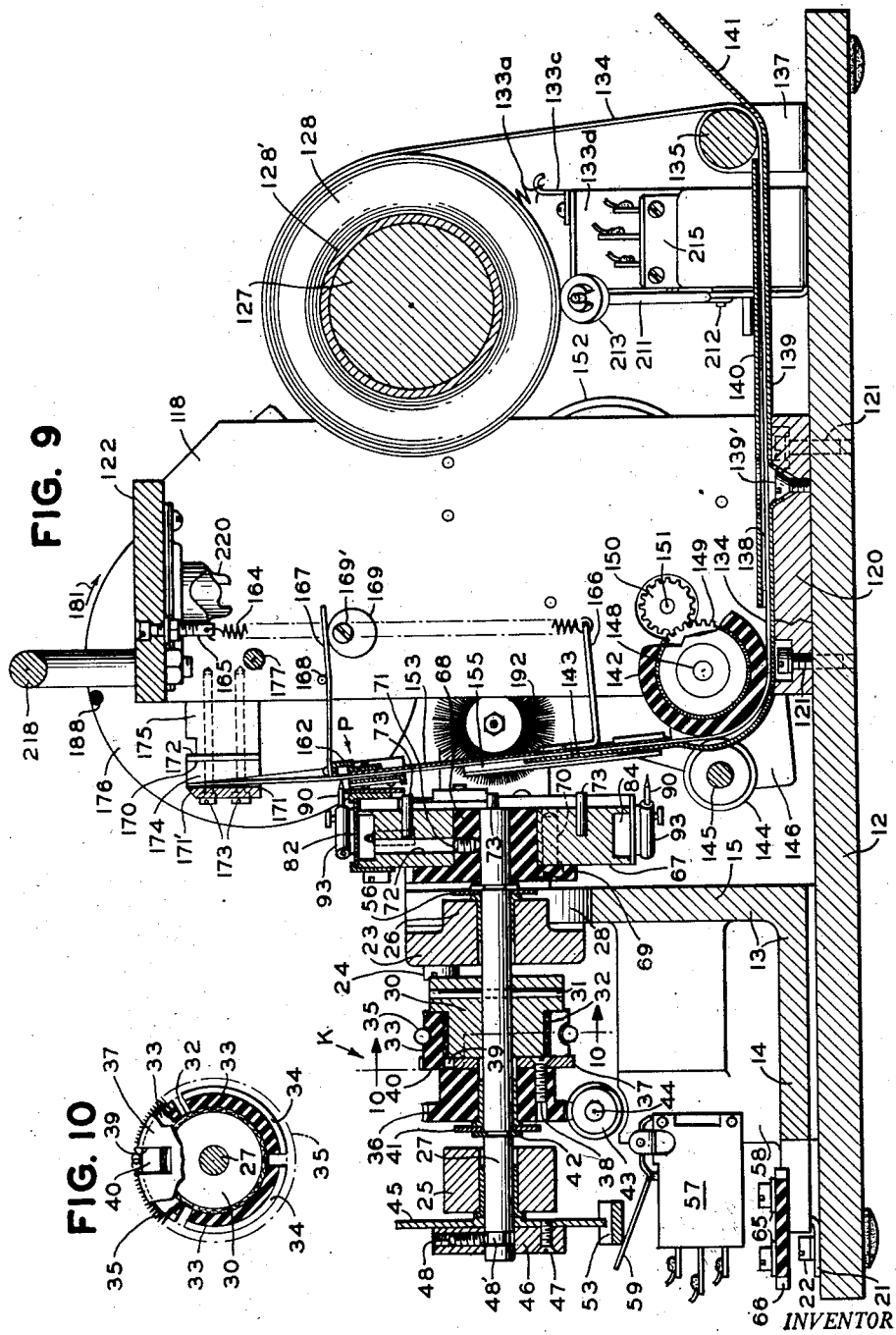

May 19, 1953
F. G. HALLDEN ET AL
2,639,211
MULTISTYLUS FACSIMILE MACHINE
Filed March 25, 1949
11 Sheets-Sheet 7
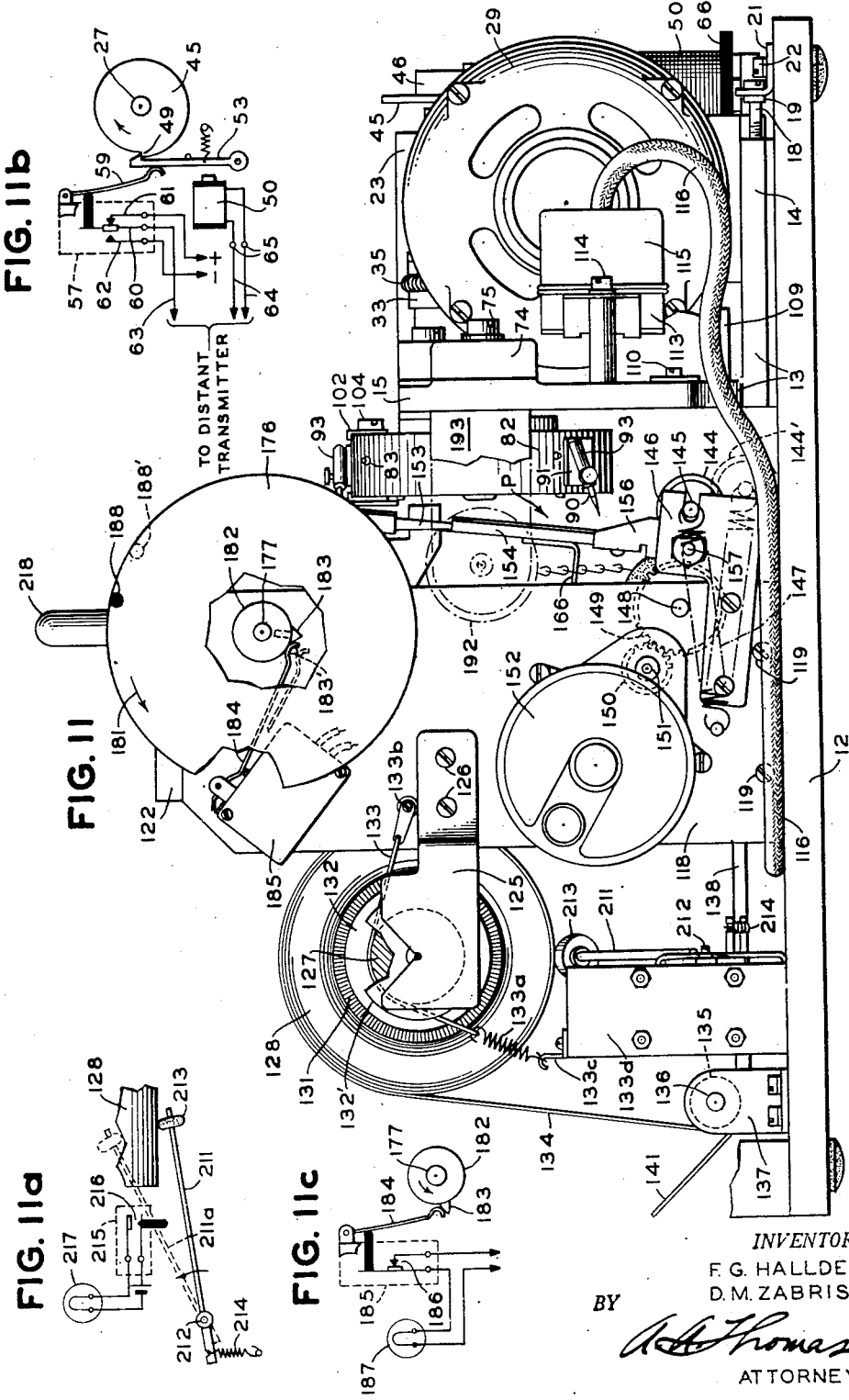
INVENTORS
F. G. HALLDEN
D. M. ZABRISKIE
BY
A. A. Thomas
ATTORNEY May 19, 1953 F. G. HALLDEN ET AL 2,639,211
MULTISTYLUS FACSIMILE MACHINE
Filed March 25, 1949 11 Sheets-Sheet 8
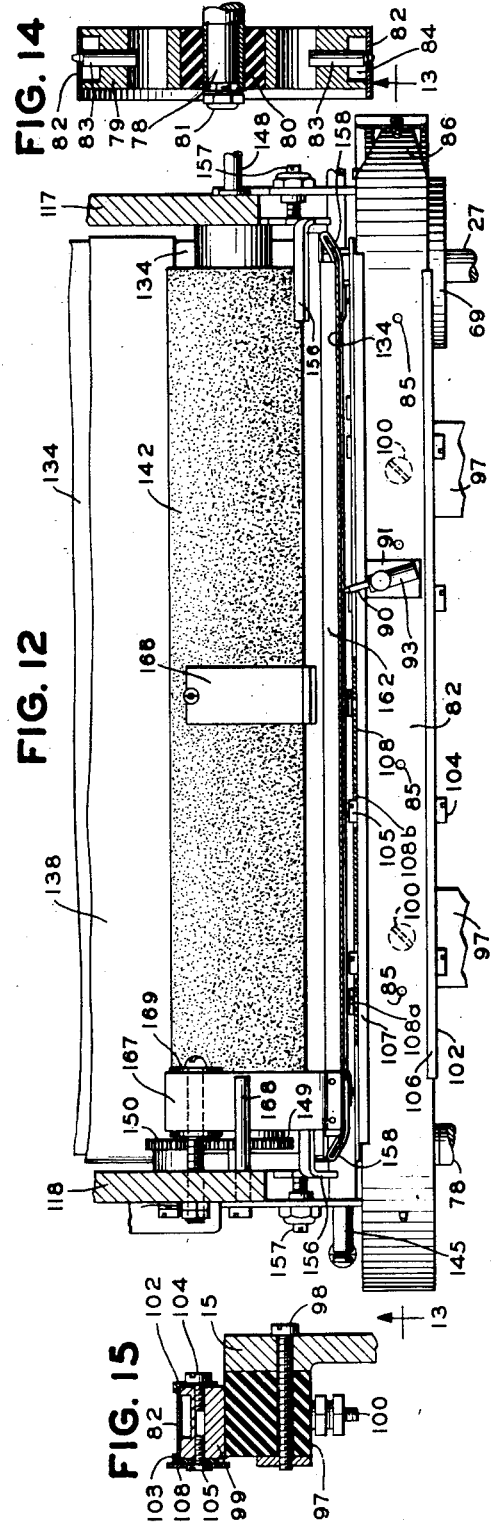
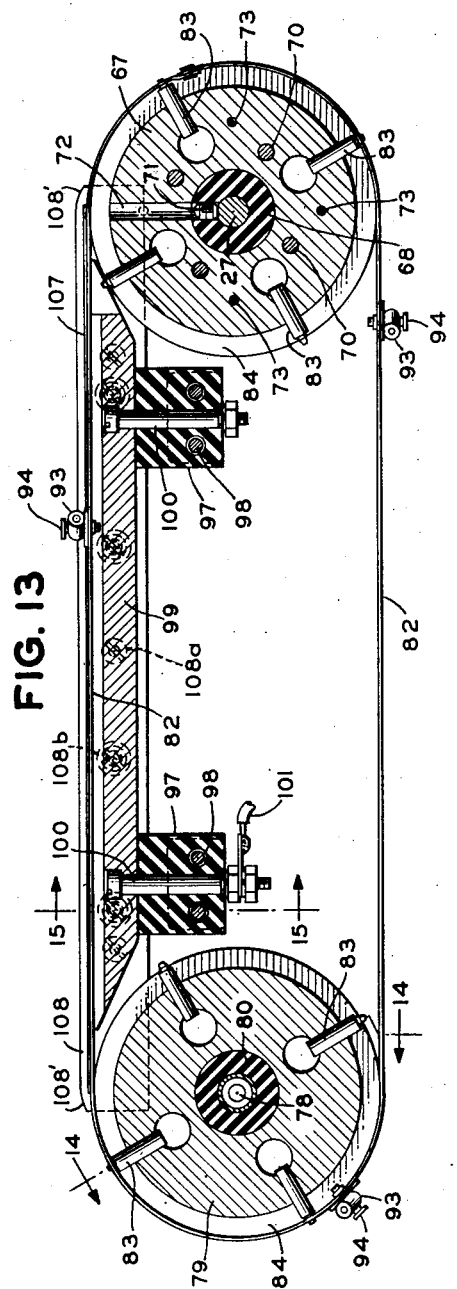
INVENTORS
F. G. HALLDEN
D. M. ZABRISKIE
BY
*A. A. Thomas*
ATTORNEY

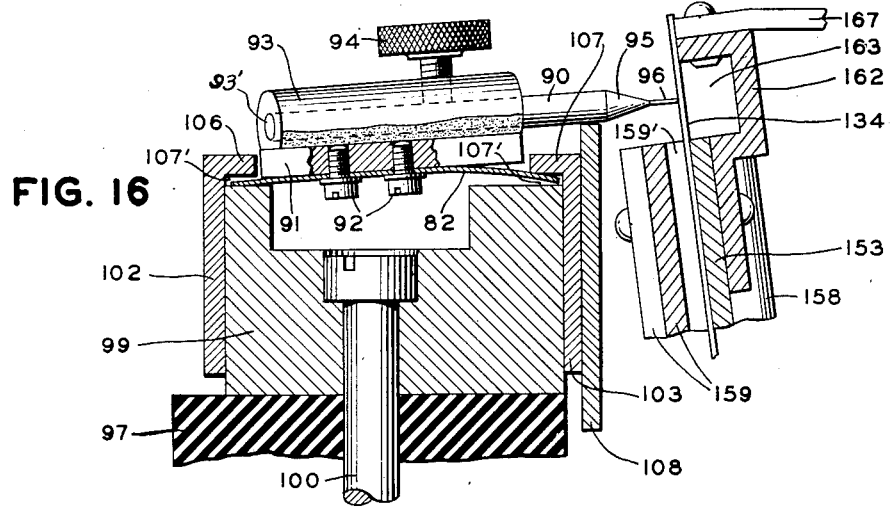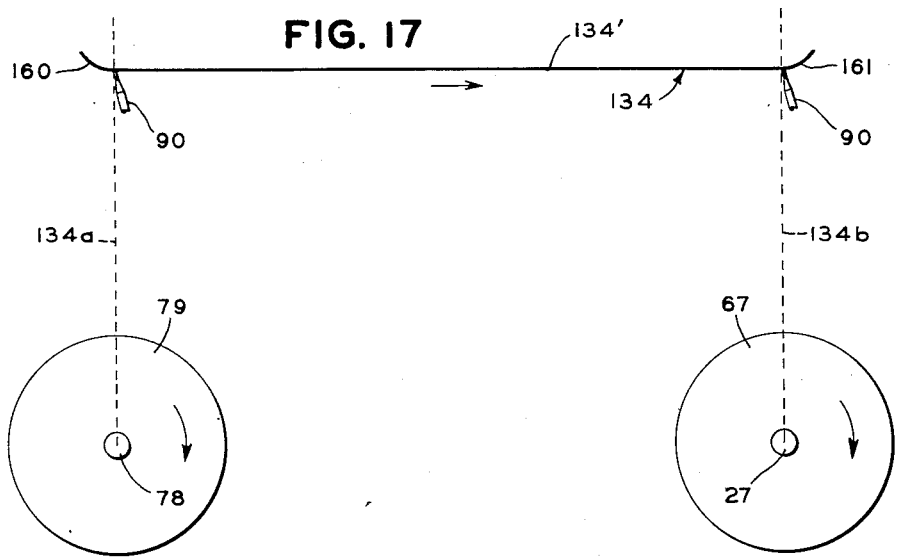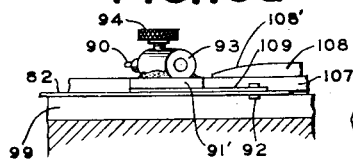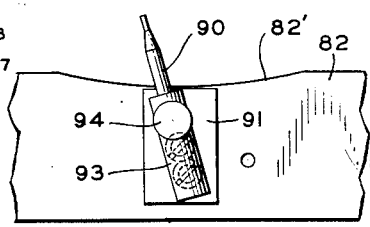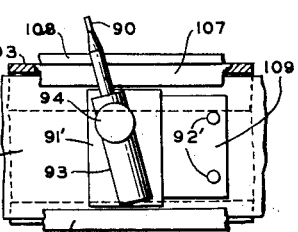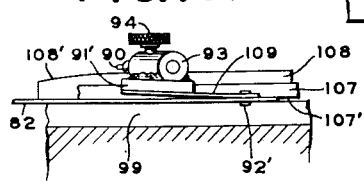

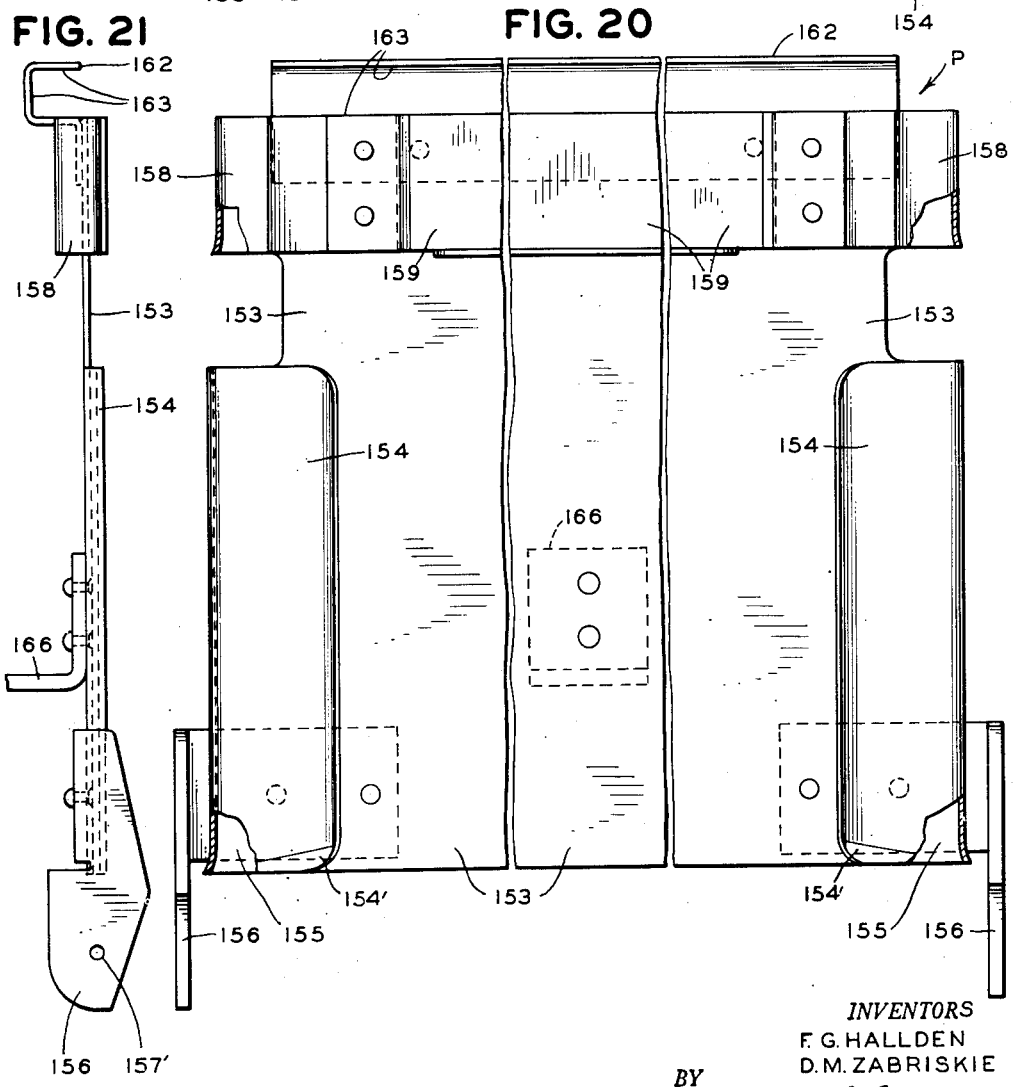

May 19, 1953  F. G. HALLDEN ET AL  2,639,211
MULTISTYLUS FACSIMILE MACHINE
Filed March 25, 1949  11 Sheets-Sheet 11
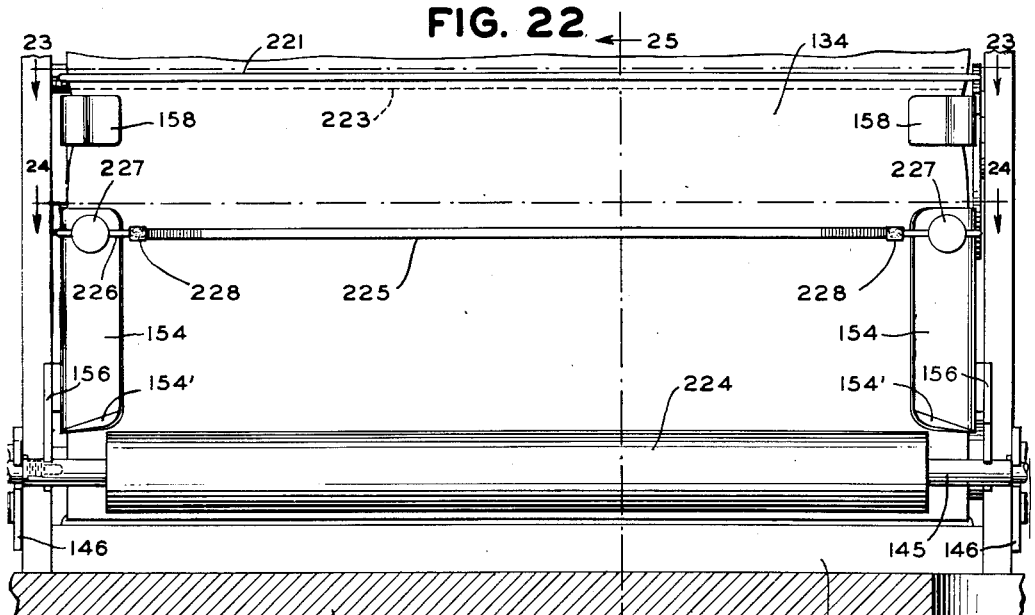
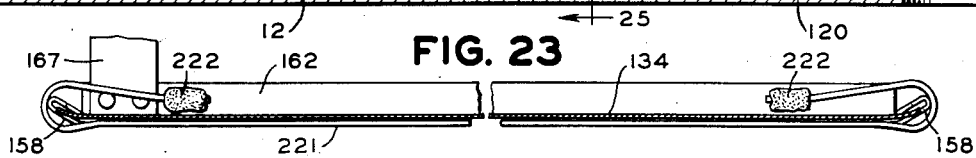
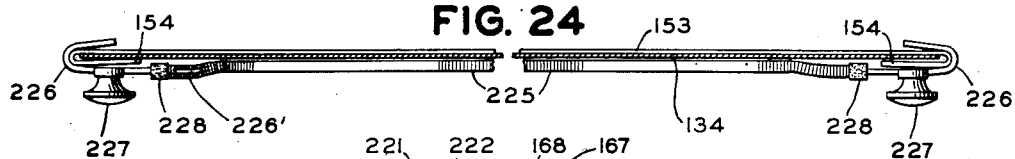
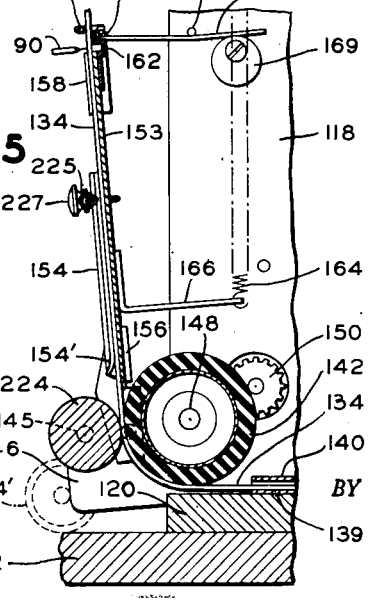
INVENTORS
F. G. HALLDEN
D. M. ZABRISKIE
BY
A. C. Thomas
ATTORNEY Patented May 19, 1953

2,639,211

UNITED STATES PATENT OFFICE 2,639,211

MULTISTYLUS FACSIMILE MACHINE

Frederick G. Hallden, Bellerose, N. Y., and Douglas M. Zabriskie, Northvale, N. J., assignors to The Western Union Telegraph Company, New York, N. Y., a corporation of New York Application March 25, 1949, Serial No. 83,333

26 Claims. (Cl. 346—139)

Our invention relates to facsimile machines of the type employing a plurality of stylus elements mounted in spaced relation on an endless belt for continuous line-by-line scanning of a synchronously moving sheet. An example of such a machine operating as a recorder is to be found in Erickson Patent No. 2,278,919, issued April 7, 1942.

In those prior multi-stylus recorders it was the conventional practice to support the paper rigidly along the scanning line by passing it around a non-yielding cylinder, like a typewriter platen, while the stylus elements were yieldingly mounted on a belt by means of a freely movable spring arm, which permitted them to move in a direction normal to the paper. The resilient stylus points would thus remain in pressure contact with the rigidly held paper surface as the belt carried them rapidly across the paper, which was slowly fed lengthwise through the machine as a continuous sheet.

In actual practice this old conventional arrangement of scanning a rigidly supported sheet with a train of styluses yieldingly mounted on a driving belt showed intrinsic defects which presented special problems to overcome them. For instance, with the yieldable styluses it was found mechanically impractical to maintain absolutely horizontal alignment of the stylus points in the operation of the machine so that an accurate even spacing of the scanning lines was not obtainable. That is to say, a stylus point would be apt to travel across the paper in a path that did not strictly coincide with the path traced by the preceding stylus, with the result that the scanning lines would be unevenly spaced (or grouped, as we call it), thus producing a distorted and sometimes unreadable recording. Also, the yieldable styluses were impractical to maintain a starting alignment of the scanning lines.

When it is considered that in facsimile page recording the transverse scanning lines are spaced only 0.01 inch apart, it will be seen that perfect alignment of the successive stylus points in the scanning path is an indispensible factor in producing a faithful record. The difficulty (we might say, the practical impossibility) of keeping the stylus points in those prior multi-stylus machines in exact alignment as they moved transversely across the sheet was inherently due to their yieldable mounting on the driving belt, so that they were free to deviate from their prescribed path of travel.

To overcome this fundamental difficulty and other objections found in prior facsimile recorders of the multi-stylus type, we have devised a novel machine in which the stylus elements are rigidly held and guided under fixed pressure to move unerringly in a predetermined path across the paper which is resiliently supported and bears against the stylus points under constant tension. Further, our novel stylus support insures the starting contact of the successive stylus points on the paper in the same vertical margin line. This concept of a series of rigidly held styluses compelled to travel successively in exactly the same path across a moving sheet of resiliently supported paper constitutes a basic feature of our invention.

Considered more specifically, our new stylus support comprises, in a preferred form, an endless metal band to which several (usually three) stylus holders are rigidly attached at equal distances apart. Each holder carries a stylus which extends across the band at the required trailing angle. A fixed rail or bar is arranged adjacent to the band in such position that each stylus, as it moves across the paper, bears with sufficient pressure against the rail which thus compels each stylus to travel in a predetermined scanning path from which it can not possibly deviate. We prefer to mount the stylus holders on a band of thin steel which is slightly flexible transversely and thereby holds each stylus pressed against the rail during a scanning operation, as will be explained later on.

Since the styluses in our machine are mounted rigidly in a direction normal to the paper, it is necessary to support the paper resiliently. We accomplish this by providing a movable frame or platen which holds a sheet of paper under tension in scanning position so that it constantly presses against the moving styluses and is free to follow any wear on the stylus tips. The recording paper is automatically fed in a continuous sheet from a supply roll and is guided by the platen into upright position like a flat sheet or page for scanning by the successive styluses. These are so spaced that, as one stylus leaves the paper, the next one starts its run across the sheet, whereby the styluses act as a constant load on the resilient sheet for a continuous line-by-line scanning.

In the operation of the machine as a recorder, a continuous sheet is fed automatically up the platen at a very low speed by driving connections from a synchronous motor. The recorded section of the sheet is exposed to view as it moves up and is torn off by the operator. Since transmitted messages will naturally vary in length, we have provided a hand wheel which enables the operator to measure off the same length of recorded sheet to be torn off after a recording operation, no matter what the length of the received message. The size of the torn-off sheet will therefore always be the same.

In a preferred form of our invention the styluses are mounted in their holders on the steel band in such a way as to be readily replaceable, like a phonograph needle. To enable the operator to insert a new stylus correctly in its holder, we have provided a stylus setting gauge on the machine adapted to engage the tip of the inserted stylus when the latter is in exact position. This gauge assures the correct mounting of every stylus on the belt in relation to the surface of the paper to be scanned.

The various novel features and practical advantages of our invention will be more fully understood from a description of the accompanying drawings which illustrate a facsimile recorder constructed in accordance with our invention and successfully operated in a commercial way. In these drawings:

Fig. 1 is a perspective of our machine with the cover on;

Fig. 1a is an enlarged plan view of a portion of Fig. 1;

Fig. 4 is a front view of the machine with the stylus drive unit removed so as to show the paper feed mechanism;

Fig. 5 shows the machine as viewed from the right side;

Fig. 6 illustrates the stylus setting gauge attached to the machine;

Fig. 7 represents a section on line 7—7 of Fig. 6;

Fig. 8 is an enlarged section on line 8—8 of Fig. 5;

Fig. 9 shows a section on line 9—9 of Fig. 2;

Fig. 10 is a section on line 10—10 of Fig. 9;

Fig. 11 illustrates a left-hand side view of the machine;

Figs. 11a, 11b and 11c show the circuits of certain switches mounted on the machine;

Fig. 12 is a plan view of the stylus carrying band and adjacent parts of the paper feed mechanism;

Fig. 13 is a section along line 13—13 of Fig. 12;

Figs. 14 and 15 are sectional views on lines 14—14 and 15—15, respectively, of Fig. 13;

Fig. 16 shows, in greatly exaggerated form, the scanning position of a stylus and associated parts;

Fig. 17 is a diagram illustrating the spacing of two consecutive styluses with respect to the width of a supported sheet;

Fig. 18 shows a modified form of stylus carrying band;

Figs. 18a, 18b and 18c illustrate a modified form of stylus mounting on the belt;

Figs. 19, 20 and 21 are enlarged illustrations of the platen structure, showing the same in plan, front elevation and side view, respectively;

Fig. 22 is a front view of a modified form of platen structure;

Figs. 23 and 24 represent enlarged sections on lines 23—23 and 24—24, respectively, of Fig. 22; and Fig. 25 is a transverse section on line 25—25 of Fig. 22.

The apparatus mounted on the base plate 12 of our machine comprises two main parts or sections: namely, the stylus drive mechanism arranged at the front as a separable unit and the paper feed mechanism disposed back of the stylus mechanism in scanning relation thereto. For convenience we shall describe the details of those two mechanisms under separate headings.

The stylus drive mechanism

Figure 2:
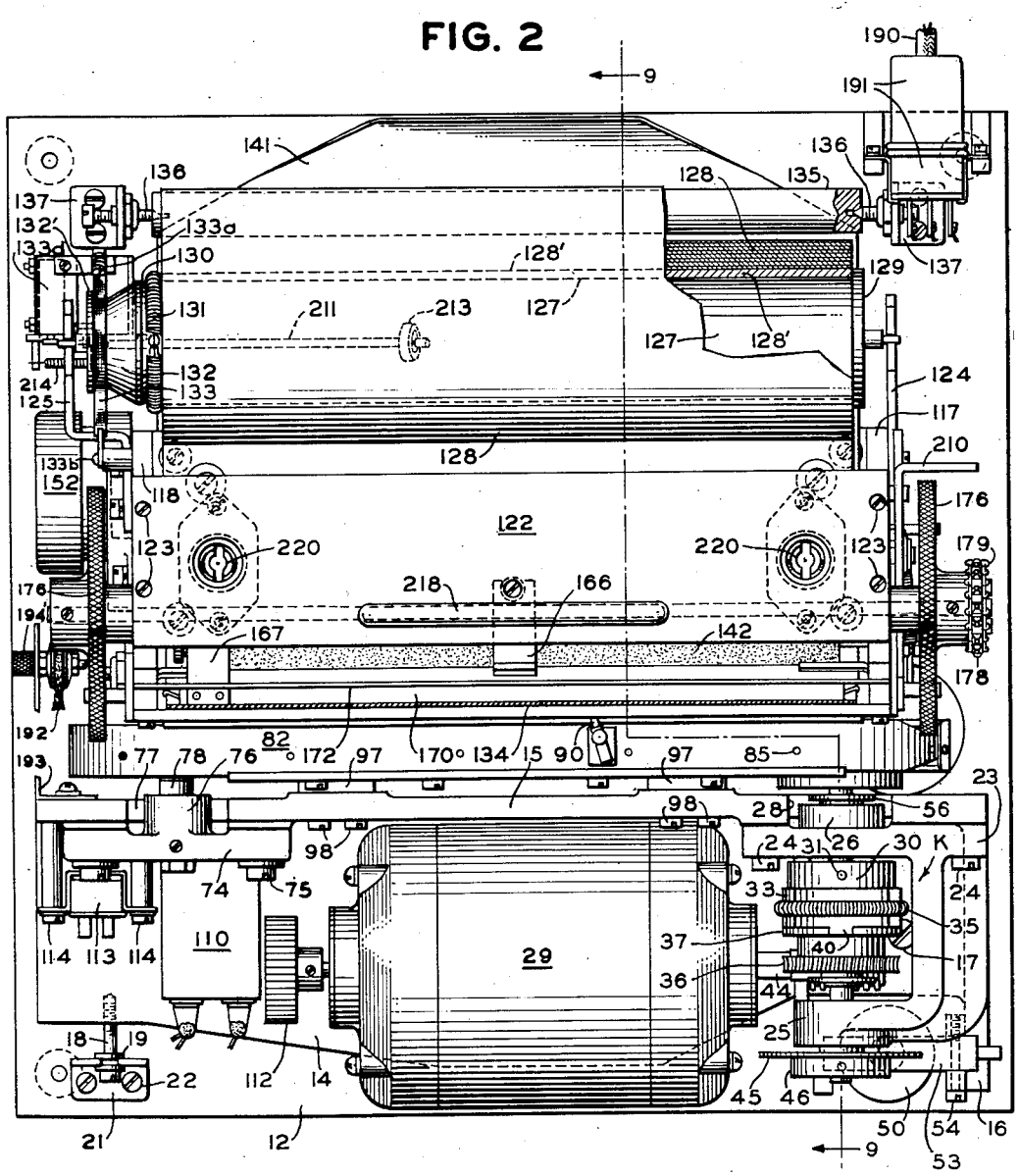
Fig. 2 is a top plan view of the machine.
Figure 3:
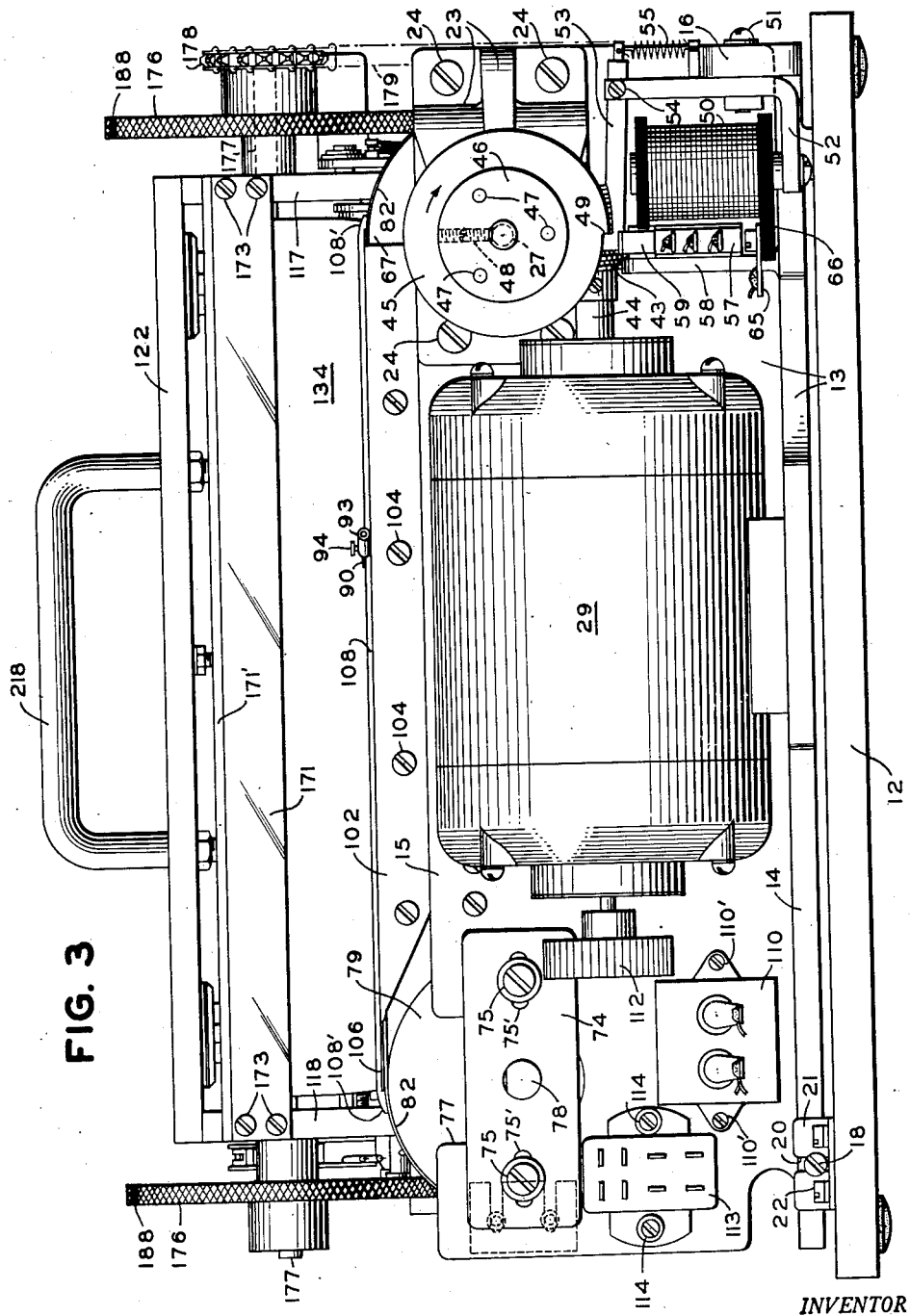
Fig. 3 is a front view of the complete machine.

The various parts comprising this mechanism are mounted on an L-shaped frame or bracket 13 which is preferably an aluminum casting with a base plate 14 and a rear wall 15 (Figs. 5 and 9). The right end of frame 13 is formed with a transverse flange 16 (Figs. 3 and 5) for supporting certain parts, as will presently appear. In the present case the frame 13 is secured to base 12 in such a way that it is adjustable thereon and removable therefrom. The right end of plate 14 is connected to base 12 by a screw 17 (Fig. 2) which acts as a pivot to permit adjustment of the frame 13 by means of a screw 18 (Figs. 2 and 3). This screw goes into plate 14 and has a grooved collar 19 seated in the open slot 20 of a small lug 21 which is fastened to base 12 by screws 22. By turning the screw 18 as required, the entire frame 13 is swung about the screw 17 for an adjustment that will be explained later. By simply removing the screw 17 the frame 13 and the mechanism carried thereby can be lifted off the base 12 as a unit, the slotted lug 21 permitting the withdrawal of adjusting screw 18.

Referring to Figs. 2, 5 and 9, a yoke-shaped bracket 23 is secured to the front face of the upright plate 15 by screws 24. The bracket 23 extends forward and terminates in a bearing 25 which is in transverse alignment with a rear bearing 26 on the bracket to support a rotary shaft 27. The plate 15 is cut away at 28 to make room for the rear bearing 26. A friction drive clutch, indicated as a unit by K, is mounted on shaft 27 to connect the latter with a synchronous motor 29 which rests on the base plate 14 and is suitably secured in place.

As clearly shown in Figs. 9 and 10, the friction clutch has a hub 30 which is keyed to the shaft by a pin 31. The reduced forward end of hub 30 carries a friction sleeve 32 of felt or the like, on which three segmental blocks 33 are mounted with a slight clearance between them. These blocks, which may be of hard insulating material, are formed with a peripheral groove 34 in which a circular coil spring 35 is seated. This spring, by its constant tendency to contract, exerts a radial pressure on the blocks 33 which are thereby held in frictional driving contact with the hub 30 through the clutch sleeve 32.

A worm gear 36, preferably but not necessarily of insulating material, is rotatably mounted on shaft 27 and is coupled to the segmental blocks 33 by means of a metal disk 37 which is secured to the rear face of the gear by screws 38. The disk 37 has three equally spaced notches 39 which fit over corresponding lugs 40 projecting forward from each of the clutch blocks 33. Only one interlocking connection 39—40 is shown in Figs. 9 and 10, but it will be understood that there are three such connections between the parts 30 and 37 arranged 120° apart. The gear 36 is held against forward axial displacement on shaft 27 in any practical way, as by a thrust washer 41 and a snap ring 42.

The worm gear 36 is permanently in mesh with a worm pinion 43 fixed on the motor shaft 44 so that the shaft 27 is driven through the frictional clutch K when the shaft is free to rotate.

In that case the gear 36 and hub 30 operate as a unitary driving connection between the motor 29 and the shaft 27. However, when this shaft is locked against rotation (as we shall presently describe) while the motor 29 is running, the gear 36 and clutch blocks 33 rotate as before, but now these spring pressed blocks slip over the stationary hub 30 as permitted by the friction sleeve 32.

Still referring to Fig. 9, a stop disk 45 is fixed on the front end of shaft 27 by a collar 46 which is attached to the face of the disk by screws 47. A radial set screw 48 in collar 46 enters a groove 48' in shaft 27 and locks the disk 45 to the shaft. Turning now to Fig. 3, it will be seen that the disk 45 has a peripheral tooth or stop 49 arranged in operative relation to an electromagnet 50 which is fastened to the base flange 16 by screws 51 passing through the L-shaped frame 52 of the magnet assembly. An armature bar 53 is pivoted at 54 to the magnetic frame 52 and is normally held in raised position by a spring 55. When the armature 53 is raised, it interlocks with the tooth 49 on disk 45, whereby the shaft 27 is held locked against rotation as long as the magnet 50 remains inert. When this magnet is energized, the armature 53 is pulled down to release the disk 45 and the clutch shaft 27 is free to rotate in a clockwise direction (as viewed in Fig. 3). The disk 45 cooperates with a thrust washer 56 back of bearing 26 to hold the shaft 27 against axial displacement.

The magnet 50 also controls a switch 57 which is suitably attached to a transverse web 58 of the L-shaped casting 13 (Fig. 3). The switch 57 has an arm 59 (Fig. 9) arranged to be operated by the armature 53 when the magnet 50 is energized. The purpose of switch 57 is to control the positive and negative potentials on certain phasing lines going to the distant transmitter of the system in which our recorder is connected. The phasing circuits controlled by switch 57 are not a part of this invention and are therefore not shown in the drawings. However, we have indicated the contacts of switch 57 diagrammatically in Fig. 11b to show what happens when the switch arm 59 is operated by the energized magnet 50.

Inside the switch box 57 are three contacts 60, 61 and 62. The middle contact 60 is a spring connected mechanically to the arm 59 and is thereby normally pushed out (that is, upward as in Fig. 9 and to the right as in Fig. 11b). The two outer contacts 61 and 62 are permanently connected to a local battery with the plus terminal going to contact 61, which is normally closed by the spring contact 60. As indicated in Fig. 11b, a line 63 goes from contact 60 to the distant transmitter and a pair of lines 64 connect the winding of magnet 50 with the transmitter. It may be assumed that the lines 64 are connected to the terminals 65 mounted on the insulating plate 66 of the magnet assembly (Fig. 3).

As long as the stop disk 45 is held locked by the armature bar 53 of the unenergized magnet 50, the switch contacts 60—61 remain closed and the local battery keeps a positive potential on line 63. When the magnet 50 is energized from the transmitter (at the phasing moment of the machine), the armature 53 not only releases the disk 45 and the clutch shaft 27 but also operates the switch arm 59 to close the contact 62, whereby positive potential is removed from line 63 and negative potential imposed thereon. It is unnecessary to describe what this change of potential does at the transmitter because that operation does not belong to the present invention. For convenience we shall designate magnet 50 as the phasing magnet.

Referring particularly to Figs. 9 and 13, the rear end of clutch shaft 27 extends beyond the vertical plate 15 and carries a driving pulley which comprises a metal wheel 67 fixed over a hub 68 of hard insulating material (like linen Bakelite). The hub 68 has a flange 69 through which screws 70 pass into the metal wheel 67 to secure those two parts together as a unit. It will be convenient to refer to the assembly 67—68 as the driving pulley 67, which is connected to shaft 27 in any practical way, as by a set screw 71 inserted through a radial hole 72 in the pulley. The set screw 71 is clear of the metal body of pulley 67, which is completely insulated from shaft 27 and the grounded frame of the machine. The pulley 67 carries four pins 73 which are evenly spaced and extend axially rearward for a purpose to be described later.

Referring to Figs. 2 and 3, there is shown at the left side of the machine a bracket 74 secured to the upright plate 15 by screws 75 and having a hub 76 which projects rearward through an opening 77 in the plate. The screws 75 pass through slots 75' in bracket 74, whereby the latter is adjustable toward and away from the pulley 67. A stud 78 supported in hub 76 extends rearward and has an idler pulley 79 journalled thereon. As best shown in Figs. 13 and 14, the pulley 79 has a central bushing 80 of insulating material so that the metal body of the pulley is completely insulated. A lock nut 81 retains the idler pulley 79 on the stud 78.

As seen in Fig. 13, the two insulated metal pulleys 67 and 79 are of the same size and are arranged in alignment to support an endless metal band or belt 82 which is preferably a thin flexible strip of blue tempered spring steel. The pulleys 67 and 79 are each provided with a plurality of radial pins 83 (in this instance four) spaced equally apart and projecting through a peripheral groove or channel 84 formed in the metal rim of each pulley. The belt 82 has accurately spaced holes 85 (Fig. 12) for receiving the tips of the pins 83, whereby the band is connected to the pulleys in a positive drive free of slippage. The sprocket pins 83 also prevent the belt from weaving (that is, shifting laterally) on the pulleys. This is the sole function of pins 83 on the idler pulley 79.

The belt 82 is wider than the pulleys 67 and 79 so as to project rearward beyond the pulleys (Figs. 8 and 14), for a purpose that will become clear in due course. The ends of belt 82 are riveted together as shown in the enlarged view of Fig. 8. One end of the belt is tapered off, as shown at 86 (Fig. 5), while the other end 86' is straight. It will be seen that the tapered end 86 extends into the pulley channel 84 where the two ends of the pulley overlap, with the tapered end underneath. The overlapped ends of belt 82 are secured together by a bond comprising a pair of washers 87—88 and a rivet 89. The pulley channels 84 accommodate this riveted bond in such a way that it does not interfere with the smooth riding of the belt over the pulley rims, as will be clear from Fig. 8. Since the belt travels from left to right (moving downward over the driving pulley in Fig. 5), we shall refer to the tapered end 86 as the trailing end of the belt. The adjustment of idle pulley 79 by means of the slots 75' makes it easy to fit the endless belt taut around the pulleys and to remove the belt when necessary.

The function of belt 82 is to carry a plurality of styluses 90 successively across a sheet of paper in a prescribed linear path. In one form of our invention such stylus is rigidly mounted on the belt 82 as illustrated in the enlarged view of Fig. 16. A small block or plate 91 is fastened to the outer side of the belt by screws 92 or otherwise, and on top of this plate is mounted a stylus holder 93 which is shown in the present embodiment as a small metal tube with a flat bottom so that it can be securely soldered in place.

Each holder 93 is provided with a bore or channel 93' adapted to receive a stylus 90 which is removably clamped in position by a thumb screw 94. It will be seen that the parts 91 and 93 constitute a unitary stylus mounting rigidly secured to the band 82. In other words, the stylus 90 is a rigid part of the belt, and this feature is of prime importance. The holder 93 and the thumb screw 94 make it easy to insert and remove a stylus. As seen in Figs. 12 and 18, the holder 93 is fixed at an angle transversely of the belt 82 so that the stylus 90 can engage the paper in a trailing position for scanning. The practical importance of mounting each stylus 90 rigidly (as opposed to resiliently) on the metal band 82 will become apparent as the specification proceeds.

We direct attention here to the novel construction of the stylus element 90 (Fig. 16). At the present time we make this part from a single rod of hard drawn tungsten formed with a conical or tapering shoulder 95 and a scanning point or tip 96 which is like a short piece of stiff wire. The cylindrical body portion of the stylus fits into the holder 93 and extends out of it a certain distance. The purpose of this extension and the function of the tapering shoulder 95 can best be explained later in connection with other mechanism of the machine. The scanning tip 96, instead of being an integral part of the stylus element, can also be in the form of a separate wire inserted into the end of the stylus body.

We shall now describe our novel guide mechanism associated with the upper run of the belt or band 82 for compelling the styluses 90 to traverse the same linear scanning path without the possibility of deviation. This stylus guide is one of the important features of our machine. Referring particularly to Figs. 2, 13, 15 and 16, it will be seen that the upright plate 15 carries two insulating blocks 97 which are attached to the rear face of the plate by screws or bolts 98. On top of the blocks 97 is mounted a heavy channel bar 99 which is fastened down by bolts 100 passing through the blocks. The channel bar 99, which is of good conducting metal (such as brass), is mounted beneath the upper run or stretch of the stylus belt 82 in alignment therewith, so that the belt rides along the top edges of the bar, as clear from Figs. 15 and 16. One of the bolts 99 acts as a binding post for conductor 101 for connecting the insulated styluses 90 in circuit.

The guide bar 99 has a pair of metal strips 102 and 103 secured to the sides thereof by screws 104 and 105, respectively. As best shown in Fig. 16, the strips 102—103 have turned-in flanges 106 and 107 which are slightly spaced from the channel bar 99 to form lateral grooves 107' for receiving the sides of belt 82. The grooves or channels 107' guide and hold the upper run of the belt in a fixed path. Let it be noted at this point that the tapered trailing end 86 of belt 82 insures an easy entrance of the belt into the guide channels 107' and a smooth passage therethrough. Because the upper or scanning run of the belt is supported in the narrow side channels 107' and is furthermore held against weaving by the sprocket pins 83, the tightness or slackness of the returning part of the belt is not critical and no tensioning device is needed. This adds to the simplicity of the machine and reduces its production cost.

A rail 108 is fastened to the rear strip 103 by rivets 108a or otherwise. Holes 108b in rail 108 allow it to clear the screws 105, so that it lies flat against the strip 103 (Fig. 12). The rail 108, which is a rigid bar of hard wear-resisting metal, extends above the strip 103 and is in the path of the moving styluses 90. That is, the top of rail 108 is a little higher than the normal position of the styluses on the belt 82. The ends of rail 108 are beveled at 108' (Fig. 13) so as to guide the styluses onto and down from the rail by an easy movement.

The stylus guide assembly as above described operates as follows: As a stylus 90 rides over the beveled front end 108' of rail 108, it is forced slightly upwardly against the tension of the spring steel band 82. As shown in the exaggerated view of Fig. 16, the upward deflection of the stylus as it rides onto the top of rail 108 causes a slight transverse distortion of the steel band 82, which thereby exerts a downward pull on the stylus and holds it firmly in pressure contact with the straight top edge of rail 108. This uniform pressure engagement of each stylus 90 with the fixed guide rail 108 assures perfect alignment of the stylus points in a horizontal direction so that they trace successively the identical scanning path with absolute fidelity. Consequently, the stylus points produce evenly spaced scanning lines which give a clear copy of the recorded message. Because the rail 108 prevents uneven spacing or grouping of the lines, we call it the anti-grouping bar of the machine. We use the convenient term "rail" as applied to the part 108, both in the description and claims, to represent broadly any form or kind of rigid bar or like member which provides an unyielding guide track for the stylus.

If it should be desirable in some cases to increase the transverse flexibility of the steel band 82 at the points where the styluses are mounted, that can be done, for instance, by cutting away an arc-shaped portion 82' along the edge of the belt (Fig. 18). It may be noted here that the adjustable mounting of idler pulley 79 by means of the slots 75' permits removal and replacement of the belt without disturbing the adjustments of the guide strips 102—103 and the guide rail 108.

A modified form of rigid stylus mounting is shown in Figs. 18a–18c, where the stylus holder 93, instead of being attached directly to the belt 82, is mounted on the free end of a stiff spring plate 109 which is riveted to the belt at 92' and extends lengthwise thereof. A metal block 91' is mounted on the spring plate 109 and the stylus holder 93 is soldered to the block. The spring plate 109, which is simply a flexural part of the belt structure, lies normally flat on the belt, as shown in Fig. 18a. As the stylus 90 rides over the curved front end 108' of the guide rail 108, the plate 109 is flexed upward (Fig. 18b) and exerts a constant downward pressure on the stylus, which is thereby held in firm contact with the top of rail 108. The effect thus produced is precisely the same as that of the transversely flexed belt 82 in Fig. 16, the only difference being that in Fig. 16 the lateral distortion of the belt tilts the stylus 90 slightly upward, whereas the plate 109 holds the stylus practically horizontal, since the belt remains flat.

It will be apparent, then, that the function of the transverse flexure of belt 82 in the embodiment shown in Fig. 16 is taken over by the stiff spring plate 109 in Figs. 18a–18c. In other words, these rigid stylus mountings utilize a flexural part of belt 82 to enable the styluses to ride up onto the guide rail 108 and remain in pressure contact therewith during a scanning operation. Let it be noted that as each stylus 90 (in either form of mounting) rides over the rail 108, it is held rigidly not only in its horizontal line of travel but also in a direction at right angles thereto. In the actual machine, the upward movement of a stylus on the belt from normal to scanning position is only a few thousandths of an inch.

Before leaving the belt drive mechanism mounted on the removable frame 13, we would call attention to a few additional details. The motor 29 is of the split-phase synchronous type and accordingly requires a starting condenser, which is shown at 110 in Figs. 2 and 3. This condenser is attached to the upright wall 15 by screws 110'. A handwheel 112 on the left end of the motor shaft enables the attendant to turn the stylus belt 82 when the machine is not running, as when it is necessary to insert a new stylus in a manner to be described later.

Referring to Figs. 2 and 3, it will be seen that at the left side of the machine, next to the motor starting condenser 110, is a multi-contact plug 113 which is fastened to the wall 15 by screws 114. The plug 113 is adapted to receive a socket 115 (Fig. 11) connected to the front end of a cable 116, which goes to the rear of the machine and contains certain wires for operatively connecting the recorder in the system in which it is used. The practical advantage of the separable electrical connection 114—115 lies in the fact that it makes the belt drive units of our machines easily removable and interchangeable. For instance, if the belt drive mechanism of a certain machine requires repair, it is only necessary to loosen the screw 17 (Fig. 2), pull out the socket 115, remove the mechanism and insert a new one, so that the machine will not stay out of commission.

*The paper feed mechanism*

A second main assembly of our machine is the mechanism back of the stylus drive unit for supporting and feeding a continuous sheet of paper in operative relation to the styluses 90 on belt 82. We shall now describe the details of this mechanism as illustrated in the drawings.

The main base 12 of the machine supports a pair of upright side plates 117 and 118, arranged crosswise of the machine (Fig. 4). These side plates are secured at the bottom by screws 119 to a bedplate 120, which is attached to the base 12 by screws 121 (Fig. 9). At the top the upright plates 117—118 are connected by a cross piece 122, which is fastened down by screws 123 (Fig. 2). The connected parts 117—118—120—122 constitute the main supporting framework of the paper feed mechanism.

The right-hand side plate 117 carries a straight bracket 124 and the other plate 118 supports an angular bracket 125, these brackets being secured by screws 126 or otherwise (Figs. 2, 5 and 11). The brackets 124 and 125 extend rearward to support the core 127 of a paper supply roll 128 which is wound on a pasteboard tube or spool 128'. The core 127, which may be of hard wood, is provided at the right end (Fig. 2) with an annular flange or shoulder 129, and the left end of the core has a circular groove 130 in which a looped coiled spring 131 (usually called a spring garter) is seated. The spring 131 cooperates with the shoulder 129 to retain the paper roll 128 on the core 127.

The left end of core 127 has a tapered portion 132 and a shoulder 132'. A suitable brake band 133 passes over the tapered end 132 and is held under constant tension by a contractile spring 133a (Fig. 11). The front end of brake band 133 is fastened to a pin 133b projecting from the side plate 118, and the lower end of spring 133a is attached to a hook 133c, which is secured to a bracket 133d on base plate 12. The tensioned brake band 133 places a constant load on the core 127 to prevent the paper from being wound off too fast, especially when the supply roll is getting low and there is little weight on the trunnions of the core.

Referring to Figs. 2 and 9, as the paper unwinds from the supply roll 128, it passes downward as a continuous sheet 134 around an idler roll 135, which is pivoted on trunnions 136 adjustably supported on suitable brackets 137 mounted on base plate 12. From the idler or guide roll 135 the sheet 134 passes through a horizontal chute 138 formed by a pair of thin metal plates 139 and 140 which are slightly spaced apart. These two plates may be separate pieces soldered together or they can be a single piece of sheet metal (such as brass) lapped over to provide the shallow space or chute 138. The plate 139 is secured to the cross piece 120 by one or more screws 139' which are sunk so as not to obstruct the channel 138. At the rear, the lower plate 139 has a slanting section 141 to guide the end of sheet 134 into the chute 138 when a new roll of paper is inserted. At the front the plate 139 passes around a feed roller 142, then upward to form a stationary apron 143 in front of the sheet 134.

The feed roller 142 is preferably covered with rubber to form a good gripping surface for the paper sheet which passes between the roller and a pair of pressure wheels 144 mounted on a shaft 145 (Figs. 4 and 9). The ends of this shaft rest in slotted brackets 146 (Figs. 5 and 11) secured to the side plates 117 and 118. Contractile springs 147 attached to the ends of shaft 145 hold the wheels 144 continuously pressed against the feed roller 142 to insure proper feeding of the paper when the roller is operated. The springs 147 allow the shaft 145 to be pulled forward by hand against the front edge of brackets 146 in order to hold the wheels 144 temporarily away from the roller 142, as indicated at 144' in Fig. 11. This makes it easier to insert a sheet around the feed roller 142 which is mounted on a rotary shaft 148 journaled in the side plates 117 and 118. The left end of shaft 148 carries a gear 149 arranged in permanent mesh with pinion 150 on the driving shaft 151 of a small synchronous motor 152 (Figs. 9 and 11). It is convenient to mount this motor on the outer face of the left plate 118.

The continuous sheet 134 passes from the feed roller 142 upward onto a resiliently supported platen which is one of the major features of our invention. The construction of this platen, indicated as a whole by P, is shown by itself in Figs. 19, 20 and 21 in enlarged proportions for clearness, and its mounting in the machine appears in Figs. 4, 5, 9 and 11.

The platen P is a rectangular frame comprising a sheet metal plate 153 provided with a pair of side wings 154 which are doubled over to form two narrow channels 155 adapted to receive the sides of the paper sheet 134 (Fig. 4). The lower corners 154' of the wings 154 are preferably bent forward to guide the inserted sheet into the channels 155. The plate 153 carries near the bottom a pair of right angled side pieces 156 adapted to receive trunnion screws 157 (Fig. 5) which are supported on the brackets 146 and enter holes 157' in members 156 (Fig. 21). The screws 157 are adjustable to centralize the platen. It is clear, then, that the platen P is hinged at the bottom to rock about the pivot axis 157.

The upper edge of the plate 153 is folded over at the ends to provide slotted extensions 158 which are connected by a strip 159. The extensions 158 and strip 159 form a thin transverse slit 159' adapted to receive and guide the paper sheet 134. The outer ends of the slotted extensions 158 are curved rearward so as to bend the sheet 134 back at its side edges, as indicated at 160 and 161 in the diagrammatic illustration of Fig. 17. The purpose of the lateral flexures 160—161 on the supported sheet 134 will appear later on.

A channel bar 162 is secured to the top edge of plate 153 and extends beyond the same to provide a recess or chamber 163 (Fig. 16) behind the sheet 134 along the scanning path of the styluses 90. The bar 162 is in effect a grooved or channeled extension of plate 153 and could be made integral therewith. Although the sheet supported by the platen lies flat against the plate 153, the stylus points 96 press against a yieldable section of the sheet due to the recess 163. Another function of this recess is to permit free travel of the stylus band 82 without damage to the stylus points when there happens to be no paper in the platen. In that case the stylus tips would ride through the uncovered recess 163.

The platen P is maintained in a resilient position by a contractile spring 164 (Fig. 9) which is attached at its upper end to a stud 165 depending from the top bar 122, and the lower end of the spring is connected to a bracket arm 166 extending from the plate 153. It is clear from Fig. 9 that the constant upward pull of spring 164 on the pivoted platen holds the latter tilted forward in a resilient position. That is to say, the platen P always tends to rock forward about its bottom pivot 157, so that the resiliently supported paper sheet bears under constant tension against the rigidly mounted styluses 90 as the latter move across the sheet.

It is desirable to keep a constant frictional load on the resiliently supported platen P to reduce the vibration caused by the impact of the styluses 90 on the paper when they first make contact with it. In the present machine (Fig. 9) we attach a spring blade 167 to the top of the channel bar 162 and this blade extends rearward between a fixed pin 168 and an adjustable cam 169 mounted on the side plate 118 by a spring 169'. By rotatably adjusting the cam 169, the spring blade 167 is placed under more or less tension to exert the proper amount of friction on the movements of the platen frame. In other words, the friction blade 167 acts like a snubber to damp the vibrations of the pivoted platen under the rapid tapping action of the styluses 90 as they strike the paper in quick succession.

As seen in Fig. 9, the sheet 134 passes upward from the platen P through a slot 170 formed by a pair of spaced parallel bars 171 and 172 which are attached to the side plates 117 and 118 by screws 173. Mounting blocks 174 and 175 support the bars 171 and 172 in properly spaced relation to the platen. The front bar 171, which we preferably make of a hard transparent material such as Lucite, has a sharp edge 171' to act as a knife for cutting off the section of paper that projects out of the machine. The transparency of the knife bar 171 enables the operator to see when the last line of a recorded message has gone past the knife so that he can make sure of cutting off the complete message.

The paper feed roller 142, which is driven by the synchronous motor 152 during a recording operation, is also operable independently of the motor by means of a handwheel 176 arranged for easy access at the top of the machine. Although only one wheel is needed, we prefer to use a pair of them for convenient manipulation from either side of the machine. The hand wheels 176 are fixed on the ends of a shaft 177 (Figs. 2 and 9) which is journalled in the side plates 117—118 and projects beyond the same. The right end of shaft 177 carries a sprocket 178 which is connected by a drive chain 179 to a sprocket 180 on the end of the feed roller shaft 148 (Figs. 4 and 5).

The wheels 176 are preferably knurled on the periphery so that the operator can easily turn them with his fingertip or palm by merely pushing them rearward at the top, as indicated by arrows 181 in Figs. 1, 5 and 11. This manual operation of wheels 176, which occurs only when the machine is not running, turns the roller 142 to feed the paper upward on the platen for purposes to be presently explained. It goes without saying that the gear connections between the feed roller 142 and the driving motor 152 are such as to allow the manual operation of wheels 176 when the motor is deenergized. Of course, when the feed roller is operated by the motor 152 during a recording cycle, the handwheels 176 turn with it through the sprocket chain 179.

Referring to Fig. 11, on the left end of shaft 177 is fixed a cam disk 182 which has a tooth or projection 183 arranged to operate a switch arm 184. For brevity, we shall refer to the part 183 as the cam. The arm or lever 184 belongs to a switch 185 of standard construction, such as a microswitch, requiring no illustration or description. It is enough to say that the switch 185 is normally closed and is opened when the cam 183 moves the pivoted arm 184 down (as viewed in Fig. 11). When the cam 183 disengages the arm 184 the latter is automatically pushed out by a suitable spring action within the switch box to close the switch contacts 186, as indicated diagrammatically in Fig. 11c.

The switch 185 is in the circuit of a signal lamp 187, which is put out when the cam 183 strikes the arm 184. Although the signal lamp 187 is not a structural part of our machine, it is functionally connected therewith and is mounted within sight of the operator. The purpose of lamp 187 can be told better when we describe the operation of the machine.

The handwheel 176 (for convenience of description we shall consider the two wheels as one) is provided on its periphery with a mark 188, which may be of any suitable form or character so as to be easily seen by the operator. In the present machine as actually built, the mark 188 is a small plug of colored bakelite pressed into a slot of the wheel, and we usually refer to this mark as a bead. There is a definite angular relation between the cam 183 and the mark 188, as shown in Fig. 11. When the mark 188 on the handwheel 176 is near the top where it is easily seen, the cam 183 is just in front of the switch arm 184, which therefore remains in closed position for almost a full revolution of the wheel in the direction of arrow 181.

When the indicator mark or bead 188 is at 188', the cam 183 is at 183' and actuates the arm 184 to open the switch contacts 186 and extinguish the signal lamp 187. As the wheel completes its turn, the cam moves past the switch arm 184, which instantly returns to normal or closing position, as illustrated in Fig. 11c. At this moment the bead 188 is back in start position on top of the wheel 176, as shown in Fig. 11. A suitable indicator 189 (Figs. 1 and 1a) is placed on the cover 190 of the machine, so the operator can see when the wheel 176 has completed its turn and stop it in that precise position.

The chief function of handwheel 176 is to enable the operator to measure the exact length of sheet to be torn off by the knife 171 after each recording operation. The driving connections between the wheel 176 and the feed roller 142 are such that every revolution of the wheel feeds out a telegram-size sheet above the cutting edge of knife 171. If the wheel 176 stops short of a complete turn after a recording operation (as when a short message has been transmitted), the attendant turns the wheel rearward by hand until the bead 188 registers with the fixed indicator 189. Then the projected sheet bearing the recorded message is torn off along the edge 171. In our present practice, the length of a telegram sheet is 5¾ inches and the width of the sheet (which is the width of the paper roll 128) is 8¼ inches. These figures are mentioned merely by way of example.

*Operation of the machine*

We are now prepared to follow the operation of the machine in recording a transmitted message. It should, of course, be assumed that the receiver is in operative communication with a distant transmitter through a cable 190 (Fig. 2), which is electrically connected to the recorder circuits by a separable plug-and-socket unit 191 mounted in the back of the machine. Let us further assume that the recording paper is in the platen P with the top of the sheet torn off along the knife 171. The handwheel 176 is in starting position with the bead 188 opposite the indicator 189. The stylus driving motor 29 is running, but the stylus belt 82 is not moving because the clutch shaft 27 is held locked by the unenergized magnet 50.

The moment that the magnet 50 is energized by a phasing pulse from the transmitter, the shaft 27 is operated through the friction clutch K and the pulley 67 drives the belt 82 at predetermined high speed. At the same time, the synchronous motor 152 is energized and operates the roller 142 to feed the paper upward in the platen at a very low speed. As the styluses 90 travel rapidly from left to right across the slowly rising sheet, each stylus traces a line and makes a mark on the paper every time a signal impulse is received. This method of facsimile recording on electrosensitive paper is so well known to engineers as to require no description here.

As previously pointed out, each stylus is held rigidly in identical scanning position as it travels across the sheet in pressure contact with the guide rail 108, which prevents vertical displacement of the styluses. At the same time, the metal band 82 holds the styluses 90 against horizontal or lateral derangement with respect to the scanned surface of the resiliently supported sheet 134, which bears against the stylus points under fixed tension. As a result, the successive lines made by the styluses on the slowly moving sheet are spaced with perfect evenness and produce a correspondingly clear facsimile record.

In commercial practice, we use one hundred scanning lines per inch, which have been found to give the most satisfactory results. Accordingly, the paper moves at the slow rate of 1.80 inches per minute, while during that same interval the three styluses make 180 scanning lines. In other words, the belt 82 travels at such speed (180 R. P. M.) that it takes each stylus only one-third of a second to travel across the sheet. This gives an idea of the speed at which our machine records. Of course, these figures serve merely as a practical example and are not to be considered in any restrictive sense.

It is important to note the spacing of the styluses from each other as indicated in the diagram of Fig 17. As one stylus is leaving the flat section of sheet 134 at the right, the next stylus is entering at the left and takes up the load of the resiliently mounted sheet which is constantly pressing against the stylus points under the action of the platen spring 164. It is thus clear that during a recording operation the sheet on the platen is engaged without interruption by the successive styluses. In other words, the forwardly urged platen P always finds a rigid stylus in position to bear against.

It will be noted that the rearwardly curved front edge of the sheet on the platen (see Figs. 17 and 23) allows a gradual easy entry of the fast moving stylus points onto the sheet, so that no injury is done to the paper. While only the entry edge 160 of the paper (in this case the left one) need be flexed back, we have shown both edges in that position.

As previously explained, the stylus drive mechanism is adjustable to swing the left or leading end toward the platen so that the stylus points approach the curved left edge 160 of the sheet at an angle. This angular approach permits the stylus points to enter upon the paper so gradually that the paper is not torn when the belt drive mechanism is adjusted by the screw 18 while the belt is running.

In the particular machine shown in the drawings, the distance between the axis centers of the belt pulleys 67 and 78 equals the width of the flat section 134' of sheet 134, as indicated in Fig. 17 by the horizontal distance between the two imaginary lines 134a and 134b. However, this spacing of the pulleys, while adding to the compactness of the machine in some designs, is not essential, and the pulleys can be arranged farther apart, as they would be, for instance, when the stylus mounting plate 109 (Figs. 18a–18c) is used. What is important is the exact placing of the rigid stylus mountings on the belt so that the stylus points shall contact the paper along the imaginary marginal line 134a on the left and leave the paper at the right marginal line 134b.

As shown in Fig. 9, the platen P tips forward at the top so that the flat section of paper supported by the platen inclines rearwardly at the bottom. Therefore, while the paper is held against the scanning styluses at the top, the lower portion of the paper is held away from the inactive styluses in the lower run of belt 82. In this way the returning styluses are kept from striking and injuring the paper.

Let us remember that during a recording operation the handwheel 176 turns from its starting position in the direction of arrow 181 (Fig. 11) and its final position will depend on the length of the recorded message. That is to say, when the handwheel stops at the close of a recording operation, the indicator bead 188 on the wheel will be somewhere less than a full turn from its starting point. We are to assume that at the close of a recording cycle the paper feed motor 152 is automatically deenergized, thus stopping the wheel 176. At the same time the magnet 59 is released to lock the clutch shaft 27 (Fig. 3) and stop the belt 82. Aside from the stopping of the recording mechanism, the completion of the recorded message is signaled to the operator by the lighting of lamp 187 through suitable control circuits which do not belong to this case and therefore require no description.

We have, then, this condition at the close of a recording operation: The end-of-message lamp 187 is lighted, a portion of the recorded section of the sheet is projecting out of the machine, and the handwheel 176 is stopped after making less than one full turn. The operator now turns the wheel 176 rearward by hand until the bead 188 is opposite the indicator 189 (Figs. 1 and 1a). The full length of the recorded sheet is now projected past the knife 171 and the operator tears off the facsimile telegram sheet for delivery to its destination.

Shortly before the bead 188 comes in line with the indicator 189 as the operator turns the wheel 176 to measure off the recorded sheet, the lamp 187 goes out. In Fig. 11 this happens when the bead 188 is in position 188', for then the cam 183 operates the switch arm 14 to break the contacts 16 and open the lamp circuit. The extinguishing of lamp 187 serves as a supervisory signal which lets the operator know that it is safe to disconnect the receiver from the transmitter.

When the facsimile recording is done by an electric stylus on electrosensitive paper, a kind of soot collects on the stylus point as a product of combustion resulting from the action of the stylus on the paper. Unless this soot be removed, it will be carried along by the stylus and smudge the recording. To prevent this, we provide automatic means for cleaning each stylus before it moves into contact with the paper. Referring to Figs. 2 and 5, a circular brush 192 is mounted on a bracket 193 by means of a stud 194 on which the brush can turn. The bracket 193 is attached to the left end of plate 15 and projects toward the rear. A finger piece 194' allows axial adjustment of the brush 192 to locate it properly in the path of the styluses 90.

As each stylus moves upward on the left pulley 79, it encounters the brush 192 which knocks off any soot that may have gathered on the stylus point. And right here lies the practical advantage of the sloping shoulder 95 provided on each stylus. With a square shoulder on the stylus, the soot would stick in the corner and accumulate in a pile which would be difficult to remove. However, by making the shoulder 95 conical we eliminate all corners so that no soot can pile up. Whatever particles of soot cling to the sloping surface 95 are easily flicked off by the bristles of brush 192, which is turned a little by each stylus and thus presents a fresh cleaning surface to the next stylus. As a result, we always get clean clear copy. Further, by thus utilizing all the bristles we increase the life of the brush.

The stylus setting gauge

As can be readily seen, it is essential that the stylus tips 96 terminate in the same vertical plane. We obtain this critical adjustment of the styluses on the belt 82 by means of a gauge 195 mounted on the outer face of the right-hand plate 117, as shown in Figs. 5, 6 and 7. The stylus gauge 195 is a metal plate having an opening 196 and two slots 197 and 198. Two pins 199 and 200 carried by the upright plate 117 project laterally through the slots 197 and 198, respectively, whereby the gauge 195 is slidably supported on plate 117. The pin 199 has a head 199' for retaining the gauge 195 on its support and this head (Fig. 7) is slightly spaced from the gauge to allow a lateral movement thereof for a purpose that will presently appear.

The supporting plate 117 has a slot 201 in which is fixed a catch or detent 202, shown here as a circular head on a screw 203 by which the catch 202 is adjustable along the slot 201. The opening 196 in gauge 195 is shaped to provide a straight shoulder 204 adapted to engage the catch 202. A contractile spring 205, attached to the gauge 195 at 206 and to the plate 117 at 207, always tends to pull the gauge rearward and thus holds the shoulder 204 pressed against the detent 202. This locks the gauge plate 195 and places the vertical front edge 208 thereof in a predetermined position to set the stylus points.

Assuming that the gauge 195 has been properly adjusted for this particular machine in relation to the belt 82, the operator proceeds as follows to insert a new stylus: By turning the hand knob 112 (Figs. 2 and 3), he moves the belt 82 until the stylus holder 93 which is to receive a new stylus is in line with the edge 208 of the gauge (Figs. 6 and 7). When the stylus 90 is inserted in the holder, it is moved toward the gauge until the tip of the stylus touches the edge 208, whereupon the screw 94 is tightened to clamp the stylus in its set position. This simple procedure insures the positioning of the stylus tips in the same vertical plane on the belt.

The gauge 195 has a front extension 209 arranged in the path of the lateral pins 73 on the driving pulley 67. Therefore, the first pin that strikes the extension 209 moves the gauge 195 sideways (a movement permitted by the retaining head 199') and releases the shoulder 204 from the catch 202. The spring 205 instantly pulls the released gauge rearward, as shown in Fig. 5, so that the tips of the styluses 90 will not encounter the gauge. To set the gauge forward again, the operator grips it by the handle 210 (which may be an integral lateral flange) and pulls it forward to the position shown in Fig. 6, until the shoulder 204 automatically snaps into locking engagement with the catch 202.

It is advisable to let the attendant know when the paper supply is running low, and for that purpose we provide an automatic signal operated by a pivoted arm or lever 211 under control of the paper roll 128 (Figs. 5 and 9). The arm 211 is suitably pivoted at 212 on the bracket 133d and its free end has a roller 213 in contact with the paper roll at the bottom. The other end of arm 211 is connected to a contractile spring 214 which constantly pushes the roller 213 against the paper, so that the roller automatically follows the paper as the roll gets smaller.

The arm 211 operates a suitable switch 215 in any practical way, so we have not considered it necessary to show any details of the operative connections between the arm 211 and the switch 215. It is enough to say that the switch contacts 216 (Fig. 11a) are normally open so that the connected signal lamp 217 remains unlighted. When the paper supply has run to a predetermined low point, the arm 211 is in position 211a and closes the contacts 216, whereupon the lamp 217 lights to inform the attendant that a new roll of paper should be inserted.

Of course, the lamp 217 could be replaced by a buzzer or both kinds of signals could be operated by the switch 215.

It is very easy to remove an exhausted roll and insert a fresh one on the core 127. All that the attendant has to do is to unhook the brake spring 133a (Fig. 11), lift out the core 127 and push the empty spool 128' against the circular retaining spring 131 (Fig. 2), which is thereby dislodged and rolls down the incline 132 against the shoulder 132'. The empty spool 128' is thus released and a full one slipped over the core 127. The attendant now rolls the spring 131 back to its retaining position in groove 130.

Our machine being of the portable type, we mount a carrying handle 218 on the top plate 122, which we also use to secure the cover 190 in place. This may be done in any practical way, as by providing the cover with keys 219 (Fig. 1), adapted to be turned in locking engagement with sockets 220 (Figs. 2 and 9) secured to the underside of plate 122. When the cover is in place, all the mechanism is concealed except the handwheels 176 for measuring off a uniform length of recorded sheet and the knife edge 171 for tearing it off. The slot 190' of the cover, while above the stylus belt, is sufficiently wide to allow the attendant, by looking down at the machine, to observe the styluses as they record. This visibility of the stylus operation enables the attendant to spot instantly any faulty recording.

*Modified platen structure of Figs. 22–25*

Figs. 22 to 25 show a somewhat modified form of platen structure in which the guide strip 159 that connects the rearwardly flaring extensions 158 in Fig. 4 is replaced by a guide member 221 mounted above these extensions on the channel bar 162. A simple form of guide member 221 consists of a wire bent at the ends as shown in Fig. 23 and soldered at 222 to the top of bar 162. The wire 221 runs straight across the platen and provides a narrow channel for receiving and guiding the sheet in its upward movement, as previously explained for the guide bar 159.

The practical advantage of guide member 221 over the bar 159 is this: As seen in Fig. 4, the bar 159 is arranged below the stylus path or recording line 223, so that particles of soot dropping off the stylus points are liable to accumulate along the top edge of the guide bar and adhere to the paper. On the other hand, in Fig. 22, where the guide wire 221 is arranged above the stylus path 223, no soot can collect on it and the paper is left clear.

In Figs. 22 and 25 we show a single pressure roll 224 mounted on shaft 145, in place of the two wheels 144 of Fig. 4, to feed the continuous sheet upward into the platen by means of the motor driven roller 142. The pressure roll 224 provides a continuous contact line across the paper, which is thereby fed evenly and smoothly into the resiliently mounted platen. When the operator inserts a new sheet, he pulls the roll 224 forward to position 224' (see Fig. 25), as previously explained for the pressure wheels 144. When using the roll or cylinder 224, we dispense with the guide apron 143 of Figs. 4 and 9 and substitute a fine coil spring 225, which is stretched across the sheet to keep it in smooth condition. The spring 225 has end hooks 226 which pass around the side wings 154 of the platen to hold the spring in place. Finger pieces 227 make it easy to attach and remove the spring 225.

It is desirable to have the spring 225 as close to the paper as possible without actually touching it, and to obtain this position of the spring we provide the hooks 226 with rearwardly curving extensions 226' to which the ends of the spring are suitably attached, as by soldered joints 228. It is clear from Fig. 24 that the curved extensions 226' hold the tensioned spring 225 as a straight smooth line in close proximity to the sheet 134, so that any waves or ripples in the paper are damped out before it reaches the scanning path of the styluses. Otherwise the description of the resiliently mounted platen structure in the machine of Figs. 1 to 21 applies fully to Figs. 22 to 25.

In the preceding description we have referred to the sheet supporting structure P as a platen. We use that term broadly both in the specification and claims to include any practical form of support for holding the sheet 134 resiliently pressed against the rigidly mounted styluses 90.

The particular machine shown in the drawings was primarily designed to operate as a recorder and so we have described it as such. However, we would have it understood that our invention is not restricted to a facsimile recorder, as it is clearly capable of embodiment as a transmitter where the copy recorded on sheet 134 is scanned by the styluses 90 in the manner described for the recording operation.

It is hardly necessary to add that the various novel features comprising our invention are capable of practical embodiment in other forms than herein set forth by way of illustration. Nor is it necessary to incorporate all of our original features in the same machine, for some of them can be used without others.

We claim as our invention:

1. A facsimile scanning mechanism comprising an endless belt, driving means operatively supporting said belt, a plurality of stylus holders rigidly mounted on said belt in uniform spaced relation, a stylus rigidly carried by each of said holders, a fixed rail for guiding said belt through a scanning path, said rail having a straight rigid edge and means for retaining each of said stylus in steady pressure contact with said edge throughout its travel through the scanning path, whereby each stylus is held in strict alignment and compelled to move in the same scanning path.

2. In a facsimile scanning mechanism, a pair of pulleys, a belt supported on said pulleys, a plurality of stylus holders carried by said belt in properly spaced relation, means for supporting a stylus by each of said holders in rigid relation to said belt, a fixed rigid bar arranged between said pulleys parallel to said belt and resilient means for holding the styluses in pressure contact with said rigid bar during their scanning movement.

3. A facsimile machine having a pair of pulleys, an endless band of spring metal operatively mounted on said pulleys, said band being transversely flexible, a plurality of styluses rigidly mounted on said band for successive scanning, and a fixed rigid bar arranged to be engaged by the styluses in pressure contact produced by the transverse flexure of said band to guide the styluses in a fixed scanning path between said pulleys.

4. A multi-stylus scanning unit for facsimile machines comprising a pair of pulleys, an endless band operatively supported on said pulleys and having a plurality of properly spaced styluses mounted thereon, a guide structure arranged between said pulleys comprising channels for the sides of said band and a rigid track on which the styluses ride, and means for holding the styluses in steady pressure contact with said track as they travel the scanning distance between the pulleys.

5. A stylus support for facsimile scanning mechanism comprising a pair of pulleys, an endless flexible band of spring metal mounted on said pulleys for operation thereby, a plurality of stylus mountings secured to said metal band and equally spaced thereon, each mounting including a block rigidly secured to the band at the central portion thereof so that the sides of the band are free to flex with respect to said block, a tubular holder fixed on said block for receiving a stylus, said holder extending slantwise across the band to give the stylus a trailing position in the operation of the band, and a finger piece on said holder for tightening and releasing a stylus.

6. In a facsimile machine, stylus supporting mechanism comprising an endless band of spring metal operatively supported, a plurality of styluses rigidly mounted on said band which is transversely flexible to permit deflection of said styluses from their natural position on the band, a fixed guide bar for the scanning run of said band, flanges on said bar arranged to form guide channels for the sides of said band, and a rail secured to said bar in a position to deflect the styluses into pressure engagement with the straight top of said rail whereby the styluses are forced to travel in the same scanning path, one of said flanges serving as an abutment for the transversely flexed band when the styluses bear down on said guide rail.

7. An electric scanning mechanism for facsimile machines comprising a pair of insulated metal pulleys, an endless metal band operatively mounted on said pulleys, a plurality of styluses mounted on said band for successive scanning, an insulated metallic guide structure mounted in fixed position between said pulleys for guiding said band and styluses in predetermined paths between said pulleys, and means included in said guide structure for holding the moving belt and styluses in steady pressure contact with said fixed guide structure, whereby a good electric connection is maintained between the operating styluses and the guide structure which serves as a conductor in the stylus circuit.

8. A facsimile machine provided with multi-stylus scanning mechanism which comprises a resiliently mounted platen adapted to support a sheet in flat condition, a rotary endless belt on which a plurality of spaced styluses are rigidly mounted and held against movement in a direction normal to the resiliently supported sheet, said platen automatically holding the supported sheet in continuous pressure contact with each one of the stylus points as the styluses move horizontally across the sheet, and means for moving the scanned sheet over said platen in a direction to produce successive scanning lines by the styluses.

9. A facsimile machine having stylus scanning mechanism comprising a hinged plate provided with side channels adapted to receive the sides of a sheet which is thereby held in flat condition for scanning, a rotary endless belt on which a plurality of styluses are rigidly mounted and held against movement in a direction perpendicular to the supported sheet, spring means for constantly urging said hinged plate toward the belt, whereby the resiliently supported sheet is continuously held in pressure contact with the rigid stylus points as they move across the sheet, and means for moving the scanned sheet over said platen in a direction to produce successive scanning lines by the stylus.

10. A facsimile machine having a platen for supporting a sheet in scanning position, means for resiliently mounting said platen to move in a direction normal to the surface of the supported sheet, scanning mechanism having a plurality of spaced styluses so mounted as to be rigidly held against movement in a direction normal to said sheet, and means including a rigid track arranged to be engaged by the styluses in pressure contact for compelling the styluses to travel in a fixed path across said sheet, which constantly bears against the scanning stylus points.

11. In a facsimile machine, a platen comprising a plate hinged at one end for holding a sheet in flat scanning position, means at the other end of said plate to provide a narrow transverse recess back of the supported sheet, scanning mechanism having a plurality of spaced styluses rigidly supported against axial movement and so positioned as to scan said sheet in a path in front of said recess, and spring means for constantly urging said hinged plate toward aid styluses.

12. A facsimile machine having a plurality of scanning styluses mounted on an endless conveyor so that the scanning tips move in a fixed linear path, means for rigidly holding the styluses against axial movement on said conveyor, a platen for resiliently supporting a sheet in flat condition to be scanned by said styluses, and means for holding the entry side of said sheet curved away from the stylus tips to form a beveled surface over which the styluses ride into contact with the resiliently supported sheet.

13. In a facsimile machine, stylus scanning mechanism comprising an endless belt operatively supported, a plurality of styluses mounted on said belt at equal distances and extending across the belt, means for holding said styluses from moving laterally of the belt, a fixed rail supported parallel with said belt and arranged to be engaged in pressure contact by the styluses, which are thereby held in strict alignment and compelled to travel in the same scanning path, means for resiliently holding a sheet in pressure contact with said styluses during their scanning movements, driving connections for said belt, and means for moving the supported sheet to produce successive-line scanning by said styluses.

14. A facsimile machine having a resiliently mounted platen for holding a sheet of paper in scanning position, an endless spring metal band operatively supported, a plurality of styluses rigidly mounted on said band and equally spaced thereon, said band being transversely flexible to permit deflection of the styluses from their natural position on the band, a fixed guide rail arranged to engage each stylus and deflect it into pressure contact therewith, whereby said rail rigidly holds each stylus in the linear path as it scans the sheet, said resiliently supported platen constantly pressing the sheet against the stylus points, means for operating said band to drive the styluses in succession across the sheet, and means for moving the supported sheet to produce successive-line scanning by said styluses.

15. A facsimile machine having a paper feed unit which includes a platen for supporting a sheet of paper fed from a supply roll, said platen having means for holding the entry edge of the paper curved rearward, a multi-stylus scanning unit arranged in front of said paper feed unit and having a belt which carries the styluses across the supported sheet, means for pivotally mounting said scanning unit at the trailing end of the belt, and adjusting means connected to the other end of said scanning unit for swinging the leading end of the stylus belt toward the platen, so that the stylus points approach the curved entry edge of the paper at an angle as the belt is adjusted into correct relation to said platen.

16. A facsimile machine having a pair of pulleys, an endless belt operatively mounted on said pulleys, a plurality of stylus holders secured to said belt and extending transversely thereof at equal distances, each holder comprising a tube adapted to receive a stylus which is adjustable lengthwise therein, a finger piece for tightening or releasing an inserted stylus, a stationary support near one of said pulleys, a stylus gauge adjustably mounted on said support, means for normally holding said gauge out of the path of the styluses, said gauge being manually adjustable into stylus setting position, means for releasably locking the gauge in its operative position, said gauge having an edge arranged to serve as a stop for a stylus to be adjusted in its holder, and means on one of said pulleys for automatically releasing the gauge from its stylus setting position upon rotation of the belt after adjustment of a stylus.

17. In a facsimile machine, a stylus driving unit comprising a base, an upright wall mounted lengthwise on said base, a fork-shaped bracket secured to said wall and extending forward transversely thereof, a shaft journalled in said bracket and arranged at right angles to said wall, a driving pulley fixed on the rear end of said shaft, an idler pulley carried by said wall in alignment with said driving pulley, said pulleys being arranged behind said wall and parallel therewith, an endless belt mounted on said pulleys, a plurality of styluses mounted on said belt in equally spaced relation, a motor mounted on said base in front of said wall and arranged axially parallel therewith, and a driving connection between said motor and shaft for operating said belt, the close parallel arrangement of said wall, belt and motor forming a compact structure mountable and removable as a unit.

18. Scanning apparatus for facsimile machines comprising a pair of spaced pulleys arranged in lateral alignment, driving means connected with one of said pulleys, an endless metal band mounted on said pulleys, means for fastening the ends of said band together in such a way that the endless band has only a single thickness all along the sides where the band rides over the pulleys, a fixed bar arranged between said pulleys and having narrow channels adapted to receive the sides of said band, said channels being formed to receive only the single thickness of said metal band, which is thereby held steady between the pulleys, the trailing end of said band being tapered to insure an easy entrance of the moving band into said guide channels, a plurality of styluses mounted on said band, guide means engaged by said styluses in pressure contact during their scanning movements, and means for holding a sheet of paper in position to be scanned by said styluses in succession as they move along said guide bar.

19. In a facsimile machine, a multi-stylus scanning mechanism comprising a pair of spaced pulleys arranged in lateral alignment, driving means connected with one of said pulleys, an endless metal band mounted on said pulleys, means passing through said band at or near the center thereof for fastening its overlapping ends together, said pulleys being grooved to accommodate said fastening means, the trailing end of said band being tapered so as to provide only a single thickness of metal all along the sides, a fixed bar arranged between said pulleys in alignment therewith, said bar providing narrow channels adapted to receive the sides of said band, said channels being formed to receive only the single thickness of said endless band, which is thereby held steady between the pulleys, the tapered trailing end of said band insuring an easy entrance of the moving band into said guide channels and a smooth passage therethrough, and a plurality of stylus holders mounted on said band in properly spaced relation.

20. In a facsimile machine, a pair of upright side plates arranged transversely of the machine, a pair of brackets secured to the lower portion of said plates and extending in front thereof, a platen comprising a flat rectangular frame pivoted at its lower end to said brackets and extending upward in front of said plates to support a sheet of paper in flat upright position for scanning, spring means connected to said platen for yieldingly holding it upright, a paper supply roll carried by said plates at the rear thereof, paper feed rollers mounted on said plates at the lower end of said platen, means forming a shallow horizontal channel between said upright plates for guiding a continuous sheet from the supply roll to said feed rollers, guide means on said platen arranged to engage the longitudinal sides of the sheet as it passes upward from said feed rollers, motor driven connections for operating said feed rollers at predetermined low speed for moving the sheet upward on said platen during a scanning operation, and a scanning unit mounted in front of said platen and having a plurality of styluses for successively scanning a sheet supported on said platen.

21. Facsimile scanning mechanism comprising a belt of spring metal operatively supported, a plurality of stylus mountings secured to said belt which is slightly flexible transversely, and a fixed rail arranged alongside of said belt in the path of said stylus mountings, which are held pressed against said rail by the transverse flexure of said spring belt to prevent vertical displacement of the stylus points and compel them to travel in the same linear scanning path.

22. In a facsimile scanning device, a rotary belt having a stylus rigidly mounted thereon as a rigid part of the belt, and adjustable means operable to secure the stylus to the belt and to release it therefrom.

23. In a facsimile scanning device, a rotary belt having a plurality of stylus mountings rigidly secured thereon, each stylus mounting including a rigid holder fixed to the belt for supporting a stylus as a rigid part of the belt, and adjustable means for releasably securing the stylus to the holder.

24. In a facsimile scanning device, a rotary belt having a plurality of stylus supports mounted thereon, each support comprising a plate rigidly mounted on the belt, a stylus holder secured to the top of said plate and forming therewith a unitary structure rigid with the belt, said holder being provided with means adapted to support a stylus in scanning position, and means for clamping the stylus firmly to said holder as a rigid part of the belt, said clamping means being adjustable to release the stylus for removal.

25. In a facsimile machine, multi-stylus scanning mechanism comprising an endless belt rotatably supported, a plurality of evenly spaced blocks rigidly mounted on the belt, a stylus holder secured to the top of each block and forming therewith a unitary stylus mounting which is a rigid part of the belt, each holder having a channel adapted to position a stylus, said channel extending across the belt in a direction to hold the stylus at a trailing angle with respect to the scanning movement of the belt, and manually operable means on each holder for clamping the stylus firmly in its channel, whereby each stylus forms a rigid part of the belt, said clamping means being adjustable to release the stylus for removal.

26. In a facsimile machine, multi-stylus scanning mechanism comprising an endless belt with a flat outer side, a pair of vertical pulleys for supporting the belt to rotate in a vertical plane so that the flat outer side of the belt moves in a horizontal path for scanning, a plurality of flat blocks rigidly mounted on the outer side of the belt and evenly spaced thereon, a stylus holder secured to the top of each block and forming therewith a unitary stylus mounting as a rigid part of the belt, each block having a channel extending horizontally across the belt and adapted to hold a stylus in scanning position, and manually operable means on each holder for clamping the stylus firmly in its channel, whereby each stylus forms a rigid part of the belt, said clamping means being adjustable to release the stylus for removal.

FREDERICK G. HALLDEN.
DOUGLAS M. ZABRISKIE.

References Cited in the file of this patent

UNITED STATES PATENTS

| Number | Name | Date |
| --- | --- | --- |
| 1,339,566 | Launbranch | May 11, 1920 |
| 1,698,737 | Roberts | Jan. 15, 1929 |
| 1,997,137 | Florance | Apr. 9, 1935 |
| 2,212,970 | Finch | Aug. 27, 1940 |
| 2,278,919 | Erickson et al. | Apr. 7, 1942 |
| 2,375,267 | Wise | May 8, 1945 |
| 2,384,722 | Blain | Sept. 11, 1945 |
| 2,437,242 | Cole et al. | Mar. 9, 1948 |
| 2,442,150 | Scott | May 25, 1948 |
| 2,442,561 | Finch | June 1, 1948 |
| 2,451,365 | Spencer et al. | Oct. 12, 1948 |